INVENTOR.
CHARLES JONES
BY
William V. Els
ATTORNEY

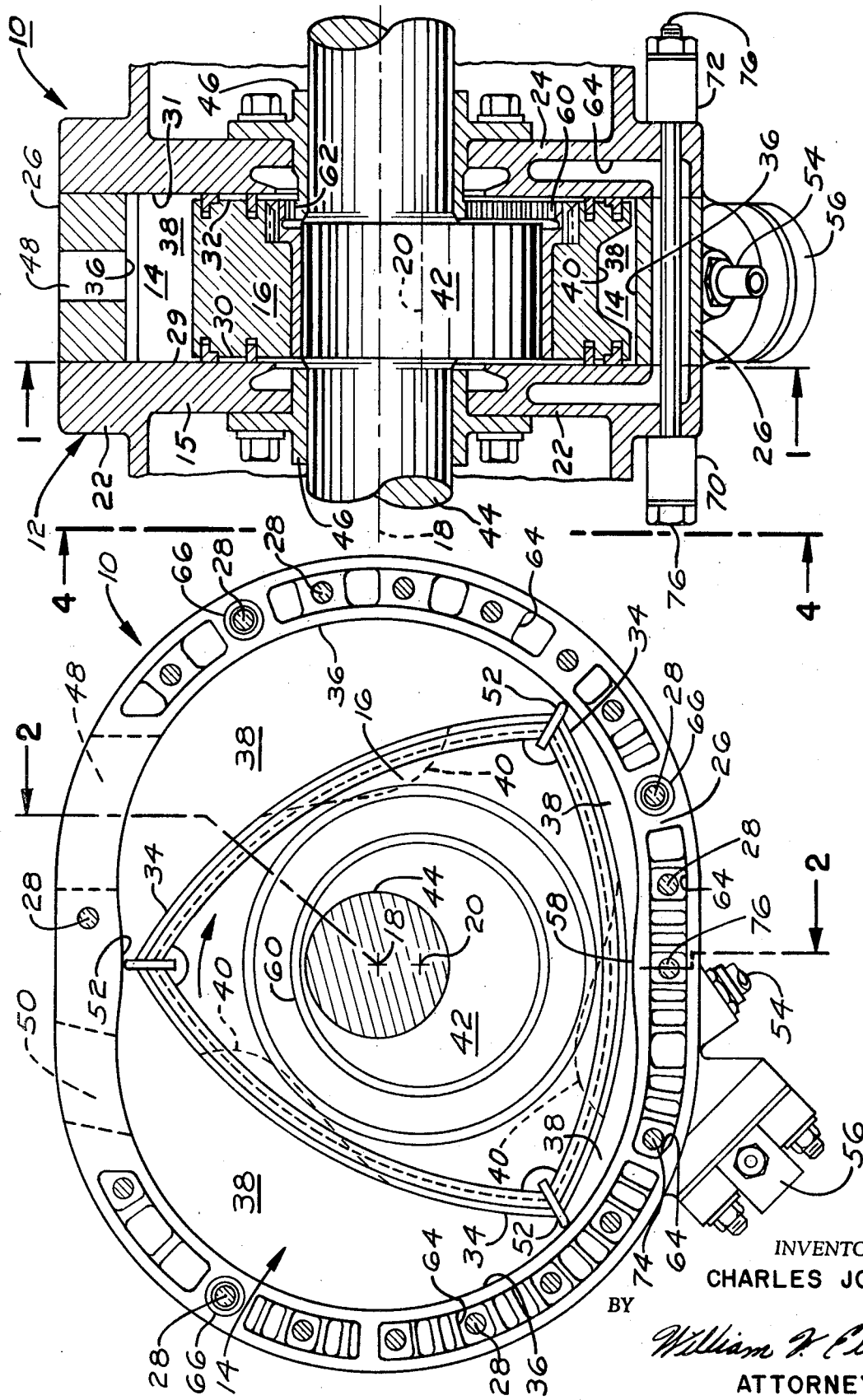

INVENTOR.
CHARLES JONES
BY
*William V. Ebs*
ATTORNEY

INVENTOR.
CHARLES JONES

INVENTOR.
CHARLES JONES

United States Patent Office 3,513,814
Patented May 26, 1970

3,513,814
CLAMPING MEANS FOR ROTARY
COMBUSTION ENGINE
Charles Jones, Hillsdale, N.J., assignor to Curtiss-Wright
Corporation, a corporation of Delaware
Filed July 29, 1968, Ser. No. 748,488
Int. Cl. B65d 45/00; F02b 53/00
U.S. Cl. 123—8.31                               9 Claims

ABSTRACT OF THE DISCLOSURE

A clamping member provided at each of the two end walls of a rotary combustion engine is used to help clamp the end wall housing sections of the engine to an intermediate peripheral wall housing section. The clamping members which are secured to the engine at opposite ends or at some intermediate point span those portions of the end walls where it is inconvenient or undesirable to provide through bolts for the purpose of securing the housing sections, one to the other, and such clamping members apply clamping forces to said engine housings through buttons, one or more buttons being interposed between each clamping member and the adjacent end wall.

BACKGROUND OF THE INVENTION

This invention relates to rotary combustion engines and is particularly directed to novel and improved means for applying clamping forces to the engine housing sections.

The intermediate and end housing sections of a rotary combustion engine are normally held together by bolts which extend through the parts. Such bolts resist separating forces due to pressure generated within the engine and prevent distortion of the housing sections by heat and pressure. It is desirable to have the bolts closely spaced around the engine in portions of the housings subjected to high temperatures and pressures, however, this is not always possible. In a rotary combustion engine of the type shown for example in U.S. Pat. 3,246,636, a portion of the intermediate housing subjected to high temperatures and pressures includes a fuel injection nozzle and ignition means, and bolts may not extend through that portion of the housing in which the nozzle and ignition means are located. In air cooled engines also, such as shown in U.S. Pat. 3,289,650, an optimum arrangement of the bolts cannot be provided in the high temperature, high pressure regions of the housings since it is undesirable to have such bolts pass through the cooling fins at such location where they would interfere with the cooling effectiveness of the fins and produce pressure losses in high velocity cooling air.

SUMMARY

The invention is directed to a novel and improved structure and arrangement for clamping together and holding the end and intermediate housing sections of a rotary combustion engine in an assembled relationship.

It is an object of the invention to provide improved means for applying clamping forces to the end and intermediate housing sections of a rotary combustion engine in areas where it is undesirable to use bolts for this purpose.

It is also an object of the invention to provide improved means for applying clamping forces to the end and intermediate housing sections of a rotary combustion engine comprising structural members which may be secured to the end housing sections and buttons that act in concert with the structural members to apply forces to the housing sections.

Other objects and advantages of the invention will become apparent during a reading of the specification taken in connection with the accompanying drawings.

DESCRIPTION OF THE DRAWINGS

FIG. 1 is a transverse sectional view taken along the line 1—1 of FIG. 2 looking in the direction of the arrows and showing a rotary combustion engine embodying clamping means according to the invention;

FIG. 2 is a sectional view taken along the line 2—2 of FIG. 1 and looking in the direction of the arrows;

DESCRIPTION OF THE PREFERRED EMBODIMENTS

Figure 3:
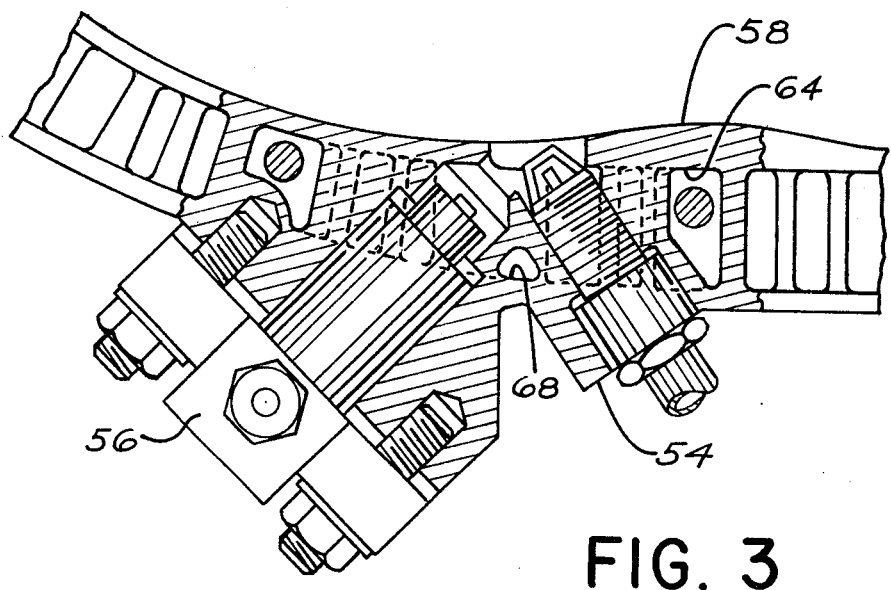
FIG. 3 is an enlarged fragmentary transverse sectional view showing a portion of the outer body of the engine of FIGS. 1 and 2 at the location of fuel injection and ignition means.
Figure 4:
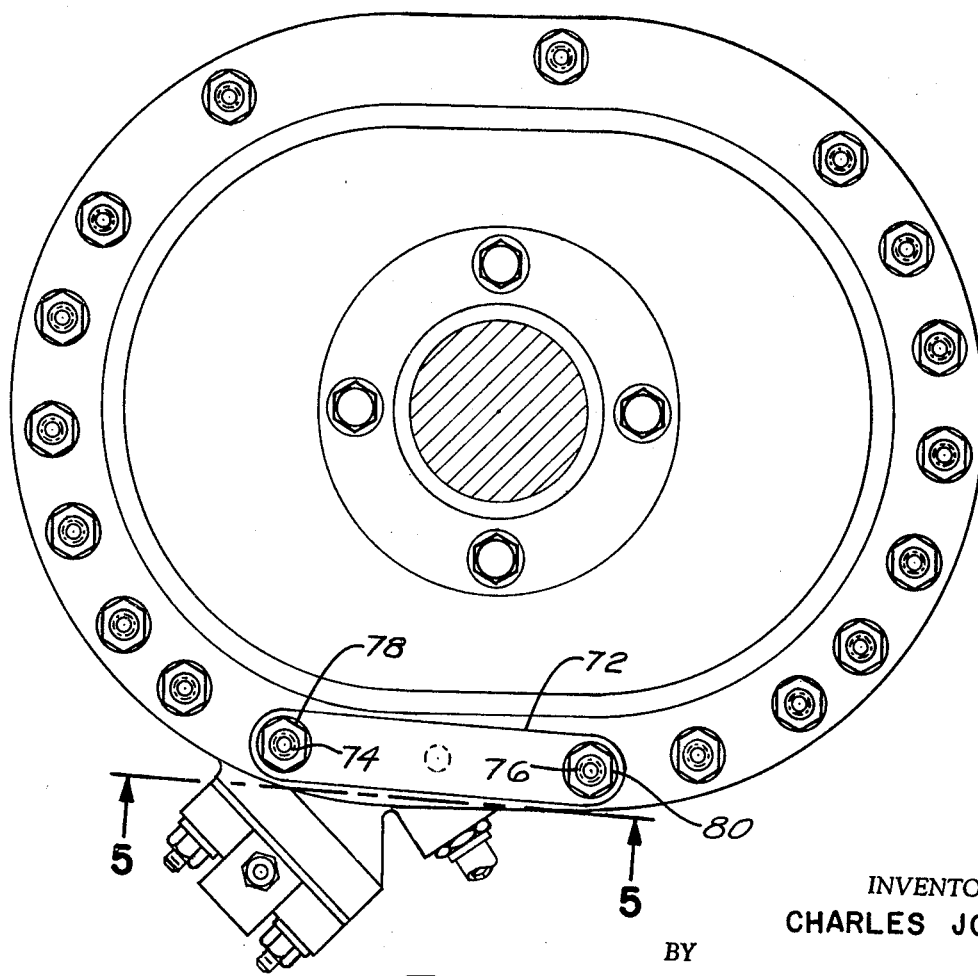
FIG. 4 is an end view of the engine of FIGS. 1 and 2 taken on the plane of the line 4—4 of FIG. 2 in the direction of the arrows.

Referring first to FIGS. 1 and 2 of the drawings, reference character 10 designates a rotary combustion engine of the type shown in U.S. Pat. 3,246,636. The engine comprises a multi-part outer body or housing 12 having a cavity 14 in which an inner body or rotor 16 is received. The outer and inner bodies 12 and 16 are relatively rotatable and have laterally spaced axes 18 and 20 respectively. The multi-part outer body or housing 12 comprises axially-spaced end wall housing sections 22 and 24 and a peripheral or intermediate wall housing section 26 which interconnects the end wall housing sections 22 and 24 to form the cavity 14. The housing sections 22, 24, and 26 are secured together by bolts 28 and by clamping means hereinafter described.

In a plane normal to its axis 18, the cavity 14 has a multi-lobed profile which preferably is basically an epitrochoid. In the specific embodiment illustrated, the outer body cavity 14 has two lobes. However, it is well known that such outer body cavity may have any number of lobes.

The rotor 16 has axially-spaced end faces 30 and 32 disposed adjacent to the end walls 29 and 31, respectively. These end faces 30 and 32 have a plurality of circumferentially-spaced apex portions 34. The rotor apex portions 34 are in continuous engagement with the multi-lobed inner surface 36 of the outer body 12 and form a plurality (3 in the embodiment illustrated) of working chambers 38. These chambers 38 vary in volume upon the relative rotation of the rotor 16 and the outer body 12 during engine operation. The profile of the outer surface of the rotor 16 between the apex portions 34 is so shaped as to operate in an interference free manner relative to the outer body 12. Thus, as illustrated, the outer surface of the rotor 16 has a triangular profile with outwardly arched sides. Each working chamber 38 includes a trough-like recess 40 in the adjacent working face of the rotor 16. This recess 40 forms a substantial part of the chamber 38 during combustion therein.

In the embodiment illustrated, the outer body 12 is stationary. The rotor 16 is journaled on an eccentric portion 42 of a shaft 44. The shaft 44 is supported by bearings 46 carried by the outer body 12. The shaft 44 is coaxial with the geometrical axis 18 of the outer body 12. The shaft eccentric portion 42 is coaxial with the axis 20 of the rotor 16. During engine operation, the rotor 16 has a planetary motion (clockwise in FIG. 1) about the axis 18 of the outer body 12 and the working chambers 38 vary in volume. In each rotation of the rotor 16 about the axis 18, each chamber 38 has two positions of minimum volume and two positions of maximum volume.

An intake passage 48 for the cavity 14 is provided in the outer body peripheral wall 26 for admitting air to the working chambers and an exhaust passage 50 is provided in the peripheral wall 26 for exhausting combustion gases from such chambers. The passages 48 and 50 are disposed on opposite sides of lobe junction 52 as shown.

A spark plug 54 and fuel injection nozzle 56 may be seen mounted in the peripheral wall 26 on the side opposite from the intake and exhaust passages 48 and 50 respectively, and adjacent to the other lobe junction 58. Although the spark plug 54 and fuel injection nozzle 56 are shown on the downstream side of lobe junction 58, such ignition and fuel injection means might be located on the other side of the lobe junction instead. Alternate locations for a spark plug and fuel nozzle are discussed in the aforementioned U.S. Pat. 3,246,636.

Preferably, combustion is initiated by spark plug 54 in the lower working chamber just prior to the rotor having obtained the position of FIG. 1. During engine operation, the working chambers 38 have a cycle of operation which includes the four phases of intake, compression, expansion, and exhaust. These phases are similar to that accomplished by the strokes of a piston in a reciprocating internal combustion engine of the type having a four stroke cycle. In order to maintain the rotor 16 properly indexed with respect to the outer body 12, a ring gear 60 is provided on the rotor and a fixed pinion gear 62 is provided to engage the ring gear. The pinion gear 62 is secured to an end wall housing 24 of the outer body 12 and is coaxial with the shaft 44.

In the engine of FIGS. 1 through 5, a liquid coolant, such as water (not shown), is circulated through passages 64 in the outer body 12 for the purpose of cooling and minimizing variations of the effect of heat thereon. Such cooling means are more fully described in the U.S. Pats. 3,007,460 and 3,269,372. Hollow dowels 66 are employed about the end walls in conjunction with bolts 28 to permit the coolant to cool the bolts 28.

The rate of heat input to the outer body 12, as the engine operates, is not uniformly distributed. The heat input to outer body 12 is greatest in that portion of the housing 12 which is close to the spark plug 54 and fuel injector 56. In addition, pressures resulting from the combustion are greatest in this region.

With nozzle 56 and plug 54 located in the intermediate housing section 26 as shown, bolts cannot be employed therethrough since the cooling passage 68 (FIG. 3) provides the only space for a bolt and this passage 68 is insufficient to pass a bolt having sufficient strength to adequately clamp the engine housing at this location.

In accordance with the invention, clamping means are provided on the engine in the vicinity of the spark plug and fuel nozzle for the purpose of applying clamping forces to the housing sections in the high temperature and high pressure regions of the engine.

The clamping means of FIGS. 1 through 5 include like U-shaped bridging members 70 and 72 of steel, a titanium alloy or other suitably resilient material at end wall housing sections 22 and 24 respectively. Such bridging members 70 and 72 span those portions of the outer body 12 of the engine in which the spark plug and fuel nozzle are located, and said members are secured at their ends to the end wall housings by through bolts 74 and 76 having nuts 78 and 80 respectively tightened thereon. A button 82 mounted in a recess 84 of end wall housing 22 midway between bolts 74 and 76, and a button 86 mounted in a recess 88 in end wall housing 24 midway between the bolts are engaged by bridging members 70 and 72 respectively. The bridging members 70 and 72 which are caused to bear against the buttons when nuts 78 and 80 are tightened apply a clamping force to the housing sections in line with the buttons thereby eliminating the need for a bolt at the location of the buttons. The bridging members 70 and 72 are formed without the curvature shown, but are bent to the curved outline indicated when nuts 78 and 80 are tightened. Preferably there is provided a spherical washer 81 under each bolt head and nut of the clamping means and a spherical recess 83 for each such washer to accommodate movement of the end portions of the bridging members as the nuts 78 and 80 are tightened.

Figure 5:
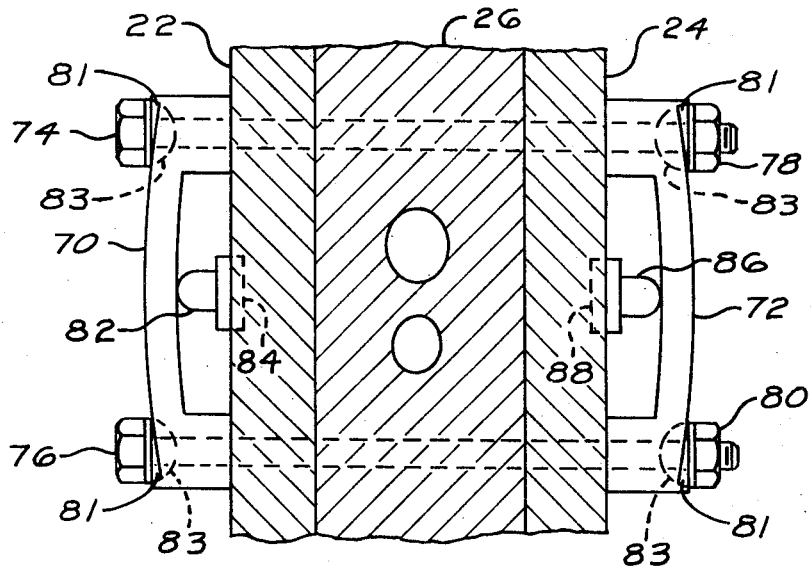
FIG. 5 is a partial section taken along the line 5—5 of FIG. 4, looking in the direction of the arrows and showing the engine clamping means.
Figure 6:
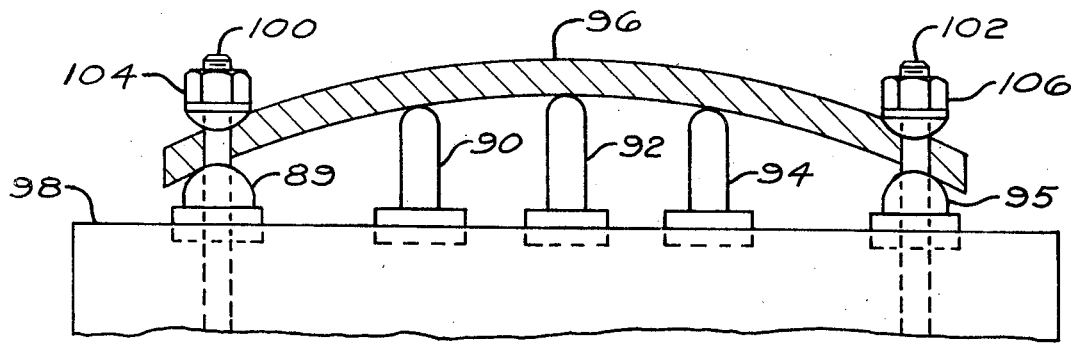
FIG. 6 is a sectional view showing another embodiment of the clamping means.

Of course, a plurality of buttons, shims or other similar load transmitting elements may be used in conjuction with each bridging member instead of a single button (as shown in FIG. 5) in order to apply a clamping force at each of several locations where it is inconvenient or undesirable to provide a through bolt, and instead of providing U-shaped bridging members to apply clamping forces, loading bars may be provided at the end wall housing sections for this purpose. FIG. 6 illustrates the use of a plurality of buttons 90, 92 and 94 at locations where it is inconvenient to use through bolts and a loading bar 96 for applying forces to such buttons. As shown the bar 96 is secured at opposite ends to an end wall housing section 98 of a rotary combustion engine by bolts 100 and 102 having nuts 104 and 106 thereon. Such loading bars are formed as straight pieces and bent to the form indicated by tightening the nuts 104 and 106 such that the bars acting through buttons such as 90, 92 and 94 are caused to exert clamping forces on the engine housing sections. Buttons such as 89 and 95 through which the bolts 100 and 102 respectively may pass and through which forces may be applied to the housing at the locations of the bolts are provided between each loading bar and end wall housing section as shown.

Figure 7:
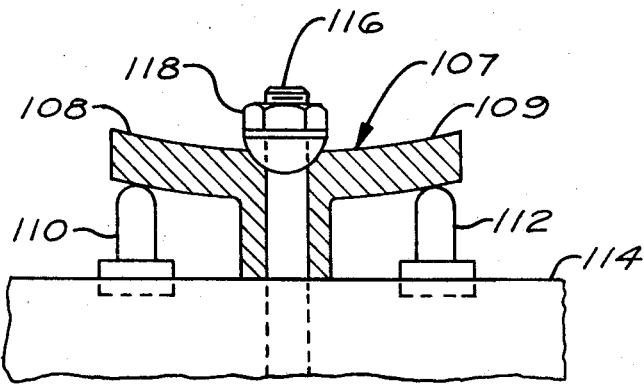
FIG. 7 is a sectional view showing still another embodiment of the clamping means.

FIG. 7 illustrates another arrangement for use in applying clamping forces in locations where through bolts cannot conveniently be used. A T-shaped member 107 with arms 108 and 109 is used to apply such forces as at the ends thereof (as shown) or other locations through buttons such as 110 and 112 to end wall housing sections, as for example, the end wall housing section 114. Through bolt 116, located between the buttons, extends through the clamping bars, and nut 118 when tightened on the bolt causes the arms 108 and 109 to bend to the positions shown and apply clamping forces to the buttons.

In each of the arrangements of FIGS. 5, 6 and 7, the clamping members are secured to end wall housing sections by through bolts. As explained, when nuts are tightened on such bolts, the clamping members are caused to bend to the configurations shown and apply clamping forces to the engine housing through buttons at locations where it is inconvenient or undesirable to provide a through bolt. After the clamping members have been bent to the configurations illustrated additional tightening of the nuts results in clamping forces being applied to the engine housings at the locations of the bolts but does not significantly affect the clamping forces at the other locations. The clamping forces applied by the buttons at said other locations, which forces may be equal or according to any desired distribution, can be predetermined by selecting buttons of the proper height and suitably choosing dimensions and properties for the clamping member.

Figure 8:
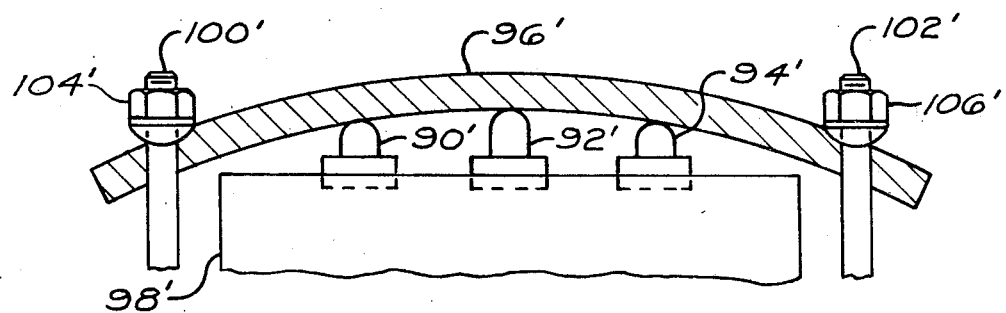
FIG. 8 is a sectional view showing a further embodiment of the clamping means.

The arrangement of FIG. 8 is similar to that of FIG. 6 and parts in FIG. 8 corresponding to those of FIG. 6 have been designated with the same reference character except that a prime mark (') has been added thereto. In the arrangement of FIG. 8, however, there is shown a loading bar 96' which extends beyond the edges of an end wall housing section 98'. Bolts 100' and 102' do not extend through the engine housing sections but merely span the width of the engine to connect with a second loading bar like the bar 96'. The nuts 104' and 105' when tightened on the bolts 100' and 102' respectively cause the loading bars to bend and apply clamping forces to the engine housings as through the buttons 90', 92' and 94' according to the height of the buttons, the dimensions and properties of the loading bars and the extent to which the nuts are tightened on the bolts.

Figure 9:
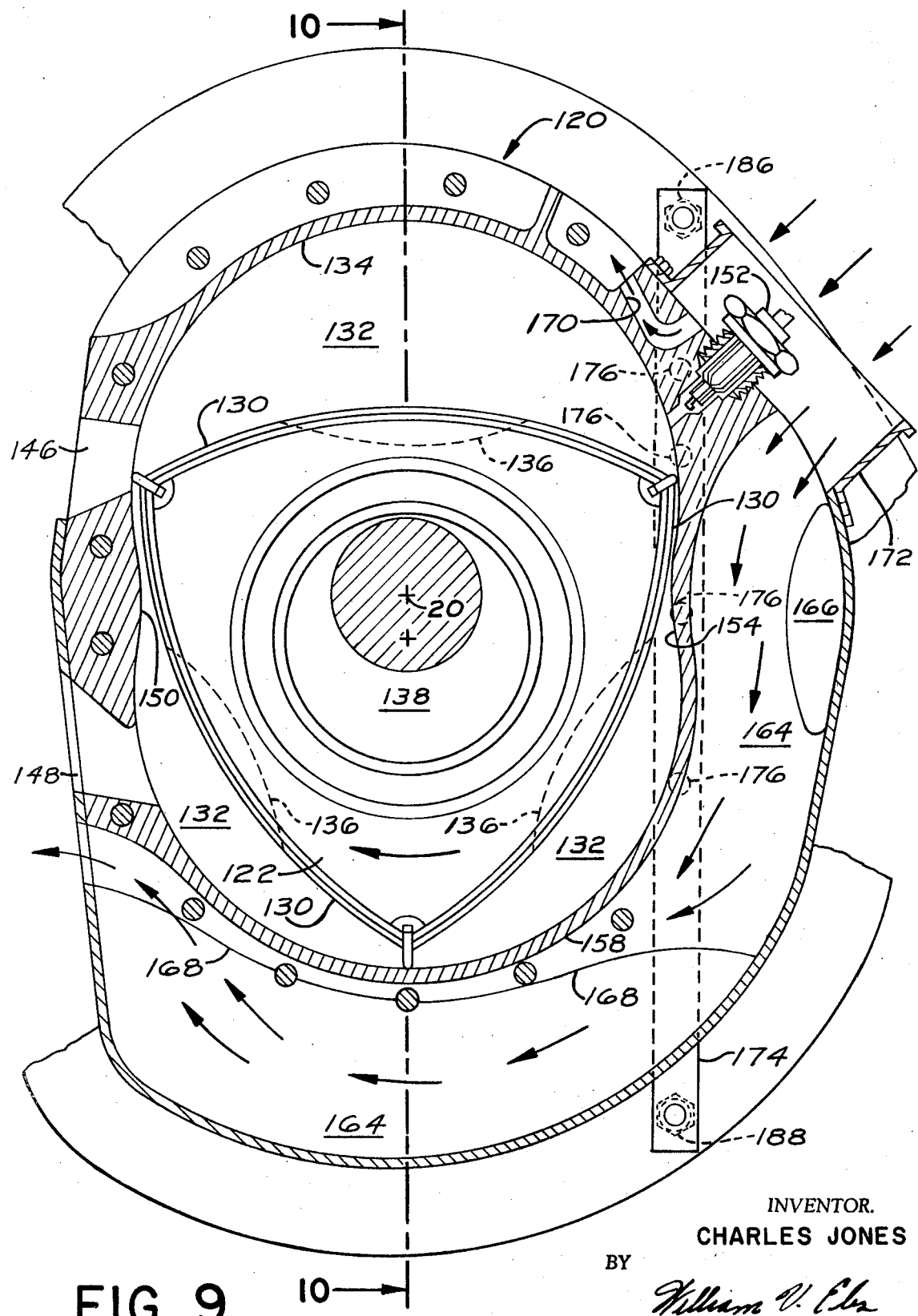
FIG. 9 is a transverse sectional view of an air cooled rotary engine embodying clamping means according to the invention.
Figure 10:
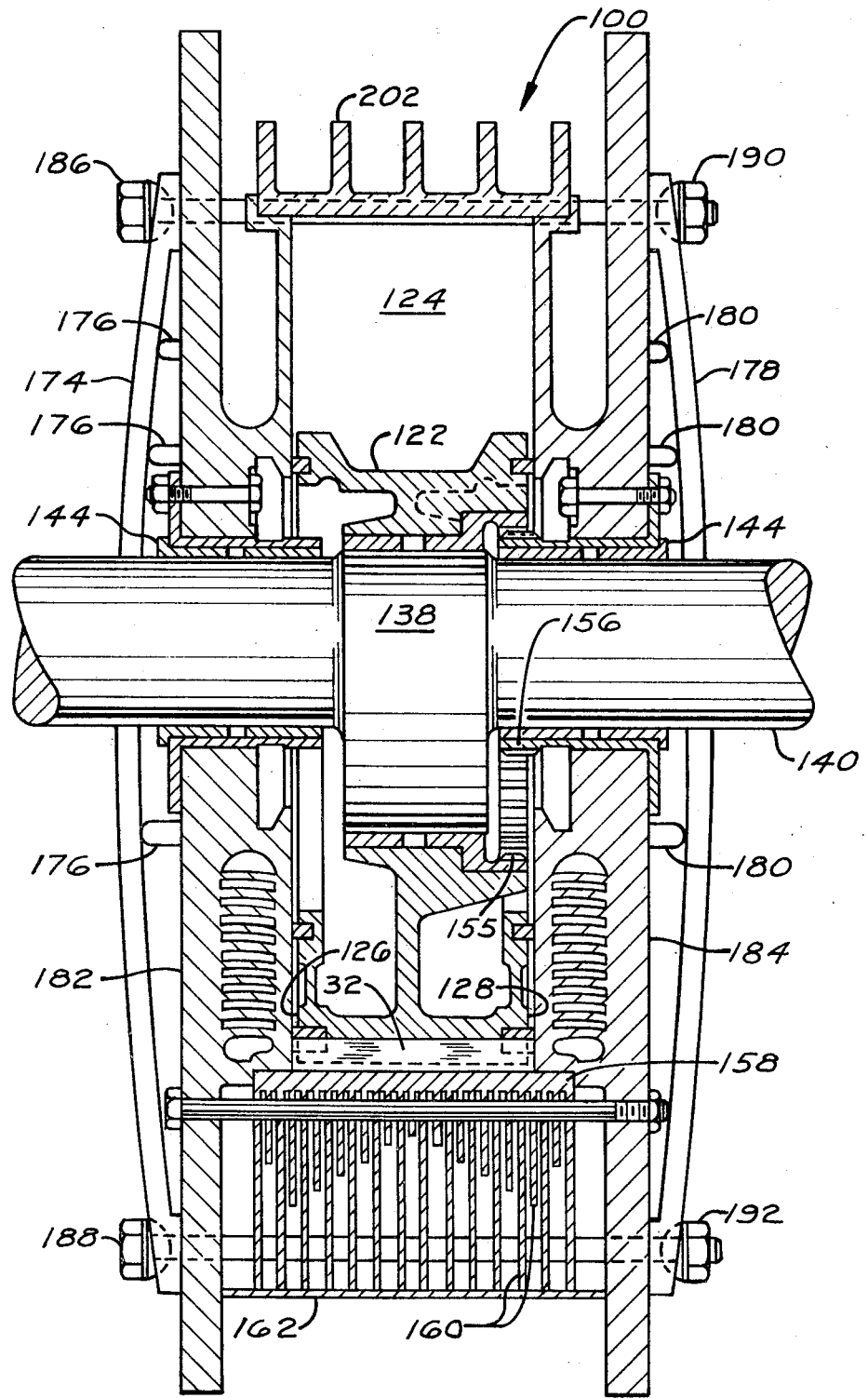
FIG. 10 is a sectional view taken along the line 10—10 of FIG. 9 and looking in the direction of the arrows.

Air-cooled engine 120 of FIGS. 9 and 10 which is of the type shown in U.S. Pat. 3,289,650, has many features identical with that of the water-cooled engine 10 of FIGS. 1 and 2. Such engine 120 like the water-cooled engine 10 has a rotor 122 rotatably mounted within a cavity 124. The end faces 126 and 128 of the rotor 122 have a plurality of circumferentially-spaced apex portions 130 and three working chambers 132 formed by the engagement of the apex portions 130 and the multi-lobed inner surface 134 of the engine 120. Each working chamber 132 includes the trough-like recess 136 in the rotor 122. The rotor 122 is journaled on the eccentric portion 138 of the output shaft 140 and the shaft is supported by bearings 144. Operation of the air-cooled engine 120 is the same as that of the water-cooled engine 10. Intake and exhaust passages 146 and 148, respectively, are disposed on opposite sides of one of the junctions 150 of the lobs of the cavity 124. A spark plug 152 is provided in the vicinity of the second lobe junction 154. Ring gear 155 on the rotor is engaged by a fixed pinion gear 156.

The engine 120 is structured for air-cooling substantially as disclosed in the aforementioned U.S. Pat. 3,289,650. Thus, the outer body peripheral wall 158 is provided with a plurality of closely spaced cooling fins 160 extending circumferentially within a housing 162 from the region of the spark plug in the direction of rotation of the rotor to a point adjacent the exhaust port 148 in order to form passages 164 through which air may be caused to flow around the wall 158 toward the exhaust port 148. The velocity and quantity of air-flow through such passages 164 is regulated in the manner described in the said U.S. Pat. 3,289,650 by reduction of the cross-section of the passageways 166 and by selectively cropping some of the fins 160 in the regions of relatively low heat input as at 168. In the region of the spark plug the outer body is formed with passages as indicated at 170 and cooling air is blown directly into such passages from air supply conduit 172.

In air-cooled engines it is particularly desirable to make the peripheral wall as thin as possible, and to provide it with external cooling fins over which air is passed to carry away the heat. Normally, the peripheral wall is not thick enough to hold bolts or bores, and in the prior art it has been customary to provide bores through the fins, external to the shell of the peripheral wall, through which tie rods or bolts might pass to hold the housing parts assembled. Such a construction is shown in U.S. Pat. 3,240,423. A disadvantage of this type of construction is that for structural reasons the bolts or tie rods have to be as close as possible to the solid portion of the peripheral wall, causing the tie rods to lie near the bottom of the cooling passages between the fins; and this positioning disturbs the airflow over the fins with a consequent loss in cooling efficiency.

In the air-cooled engine of FIGS. 9 and 10, force applying means according to the invention are employed to obviate the necessity of having bolts extend through cooling fins in regions where the greatest amount of heat is generated, that is, in regions closest to that part of the engine where combustion takes place. As shown, such force applying clamping means includes bridging member 174 with coacting buttons 176, and bridging member 178 with coacting buttons 180. As shown, the members 174 and 178 are clamped to end housing walls 182 and 184 respectively by through bolts 186 and 188 which are located at the ends of the bars and have nuts 190 and 192 tightened thereon. Bridging member 174 applies a force to and housing wall 182 through buttons 176 and bridging member 178 applies a force to end housing wall 184 through buttons 180 each of which is aligned with a button 176. The end housing walls are thereby securely clamped through the intermediate housing 202 in the high temperature region of the engine and the need for bolts at the locations of the buttons eliminated.

While several forms of the invention have been shown and described, it will be understood that still other forms are possible and that various changes and modifications may be made in the forms shown, all within the spirit and scope of the invention.

What is claimed is:

1. In a rotary combustion engine wherein an outer body includes a pair of end walls and an intermediate wall therebetween forming a cavity with the end walls, wherein a plurality of bolts extending through the end walls of the outer body secure the end walls to the intermediate wall of the outer body, wherein said cavity includes an inner body defining a plurality of working chambers with the outer body, and said working chambers vary in volume as the inner body rotates relative to the outer body, the combination comprising a pair of structural members one of which is secured adjacent to one end wall of the rotary engine and the other of which is secured adjacent to the other end wall of the rotary engine, connecting means interconnecting said pair of structural members to force each structural member toward its associated end wall, and force transmitting means including at least one force transmitting element carried by each end wall and disposed between said end wall and the associated structural member to coact with the latter to apply clamping forces to the outer body through said end walls when force is exerted by said connecting means.

2. The arrangement of claim 1 wherein the structural members are U-shaped in form.

3. The arrangement of claim 1 wherein the structural members are like metal bars of a resilient material.

4. The arrangement of claim 1 wherein a fuel nozzle and ignition means are mounted in the intermediate wall of the outer body and one of the bolts used in fastening the structural members to the end walls extending through the intermediate wall to one side of the fuel nozzle and ignition means, and the other bolt used in fastening said structural members extends through the intermediate wall on the other side of the fuel nozzle and ignition means.

5. The arrangement of claim 1 wherein the engine is air-cooled and the bolts used in fastening the structural members span a high temperature portion of the engine provided with cooling fins.

6. The arrangement of claim 1 wherein a plurality of force transmitting elements are provided between each structural member and the adjacent end wall.

7. The arrangement of claim 1 wherein the structural members are fastened between the ends with one of the said bolts and the force transmitting means comprises force transmitting elements on opposite sides of the bolt between each structural member and the adjacent end wall.

8. The arrangement of claim 1 wherein the connecting means comprises a pair of bolts.

9. In a rotary combustion engine wherein an outer body includes a pair of end walls and an intermediate wall therebetween forming a cavity with the end walls, wherein a plurality of bolts extending through the end walls of the outer body secure the end walls to the intermediate wall of the outer body, wherein said cavity includes an inner body defining a plurality of working chambers with the outer body, and said working chambers vary in volume as the inner body rotates relative to the outer body, the combination comprising a structural member having at least one of said bolts extending therethrough for securing the structural member adjacent to one end wall of the rotary engine, and force transmitting means between the structural member and the adjacent end wall for applying a clamping force to the outer body through the said adjacent end wall.

References Cited

UNITED STATES PATENTS

| 221,794 | 11/1879 | Dawson | 292—256.71 XR |
| 2,153,061 | 4/1939 | Hanks | 91—56 |
| 2,462,481 | 2/1949 | Estey | 103—136 |
| 3,373,722 | 3/1968 | Zimmermann et al. | |

MARK NEWMAN, Primary Examiner

A. D. HERRMANN, Assistant Examiner

U.S. Cl. X.R.

292—256